(12) United States Patent
Drzevieski et al.

(10) Patent No.: US 11,105,388 B2
(45) Date of Patent: Aug. 31, 2021

(54) BRAKE LINING WEAR SENSOR

(71) Applicants: Volvo Truck Corporation, Gothenburg (SE); Fabio Drzevieski, Palmeira (BR); Luciano Scoparo, Gothenburg (SE)

(72) Inventors: Fabio Drzevieski, Palmeira (BR); Luciano Scoparo, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 83 days.

(21) Appl. No.: 16/480,643

(22) PCT Filed: Jan. 25, 2017

(86) PCT No.: PCT/BR2017/050013
§ 371 (c)(1),
(2) Date: Jul. 24, 2019

(87) PCT Pub. No.: WO2018/137009
PCT Pub. Date: Aug. 2, 2018

(65) Prior Publication Data
US 2020/0011390 A1    Jan. 9, 2020

(51) Int. Cl.
*F16D 66/02* (2006.01)
*F16D 51/00* (2006.01)

(52) U.S. Cl.
CPC ...... *F16D 66/025* (2013.01); *F16D 2051/001* (2013.01)

(58) Field of Classification Search
CPC .... F16D 66/025; F16D 66/026; F16D 66/027; F16D 66/562; F16D 2125/66
See application file for complete search history.

(56) References Cited

U.S. PATENT DOCUMENTS 3,339,676 A * 9/1967 Quinn ................... F16D 65/565
                                                   188/1.11 R
5,161,648 A   11/1992 Taig
(Continued)

FOREIGN PATENT DOCUMENTS

CN       1262725 A     8/2000
CN     105051397 A    11/2015
(Continued)

OTHER PUBLICATIONS

Author Unknown, "Brake Drum, Checking," Impact 3.0, Model 56001443, Feb. 21, 2006, Volvo Group North America, 5 pages.
(Continued)

*Primary Examiner* — Thomas J Williams
(74) *Attorney, Agent, or Firm* — Withrow & Terranova PLLC

(57) ABSTRACT

A brake assembly having a non-braking configuration and a braking configuration includes a brake shoe having a brake lining coupled thereto. An actuator is coupled to the brake shoe, the actuator movable along an actuation path between a neutral actuator position and a braking actuator position. An actuator distance between the neutral actuator position and the braking actuator position increases over time in response to a reduction in thickness of a brake lining installed on the brake shoe. Moving the actuator from the neutral actuator position to the braking actuator position past a predetermined actuation distance causes a ratchet mechanism to advance to a next sequential ratchet position, which in turn moves the neutral actuator position of the actuator a predetermined distance away from the minimum actuator position. A sensor is coupled to the ratchet mechanism for detecting the sequential ratchet position of the ratchet mechanism.

20 Claims, 7 Drawing Sheets

(56) References Cited

U.S. PATENT DOCUMENTS

| | | | | |
|---|---|---|---|---|
| 5,263,556 | A | * | 11/1993 | Frania .................... B60T 17/22 |
| | | | | 188/196 D |
| 5,410,293 | A | | 4/1995 | Angerfors |
| 7,299,899 | B2 | * | 11/2007 | Severinsson ............ F16D 66/02 |
| | | | | 188/1.11 L |
| 9,279,468 | B1 | | 3/2016 | Philpott |
| 2002/0104720 | A1 | | 8/2002 | Borugian |

FOREIGN PATENT DOCUMENTS

| | | | | |
|---|---|---|---|---|
| CN | 105673743 | A | 6/2016 | |
| CN | 106062407 | A | 10/2016 | |
| CN | 106104058 | A | 11/2016 | |
| EP | 0460378 | B1 * | 10/1994 | ............. F16D 65/60 |
| EP | 1118790 | A2 * | 7/2001 | ........... F16D 65/568 |
| FR | 2986050 | A1 | 7/2013 | |
| JP | S57114045 | A | 7/1982 | |
| JP | 2006097867 | A | 4/2006 | |
| JP | 2017013970 | A | 1/2017 | |
| MX | 2016009380 | A | 9/2016 | |
| TW | 201612046 | A | 4/2016 | |
| WO | WO-9512769 | A1 * | 5/1995 | ........... F16D 65/562 |
| WO | 9729298 | A1 | 8/1997 | |
| WO | 2012018808 | A1 | 2/2012 | |
| WO | 2015146774 | A1 | 10/2015 | |
| WO | 2016168075 | A1 | 10/2016 | |
| WO | 2016180709 | A1 | 11/2016 | |

OTHER PUBLICATIONS

International Search Report and Written Opinion for International Patent Application No. PCT/BR2017/050013, dated Sep. 10, 2017, 8 pages.
First Office Action for Chinese Patent Application No. 201780083948.X, dated Jun. 17, 2020, 10 pages.
Extended European Search Report for European Patent Application No. 17894343.8, dated Jul. 28, 2020, 8 pages.
Second Office Action for Chinese Patent Application No. 201780083948.X, dated Mar. 4, 2021, 25 pages.
Gu, J. et al., "Intelligent detection device and control system for agricultural machinery brake wear," South China Agriculture, vol. 9, No. 36, Dec. 2015, pp. 183-184.
Notification to Grant for Chinese Patent Application No. 201780083948.X, dated Jun. 23, 2021, 9 pages.
Intention to Grant for European Patent Application No. 17894343.8, dated Jun. 18, 2021, 60 pages.

* cited by examiner

400 ⤦

```
┌─────────────────────────────────────────────────────────────┐
│ ACTUATING AN ACTUATOR COUPLED TO A PREDETERMINED ACUTATION  │
│ DISTANCE OF A BRAKING ASSEMBLY TO MOVE THE ACTUATOR ALONG AN│
│ ACTUATION PATH BETWEEN A NEUTRAL ACTUATOR POSITION AND A    │
│ BRAKING ACTUATOR POSITION                                   │
│ 402                                                         │
└─────────────────────────────────────────────────────────────┘
                              │
                              ▼
┌─────────────────────────────────────────────────────────────┐
│ ADVANCING A RATCHET MECHANISM HAVING A PLURALITY OF         │
│ SEQUENTIAL RATCHET POSITIONS TO A NEXT SEQUENTIAL RATCHET   │
│ POSITION IN RESPONSE THE ACTUATOR MOVING THE PREDETERMINED  │
│ ACTUATION DISTANCE ALONG THE ACTUATION PATH                 │
│ 404                                                         │
└─────────────────────────────────────────────────────────────┘
                              │
                              ▼
┌─────────────────────────────────────────────────────────────┐
│ GENERATING, BY A SENSOR OPERABLY COUPLED TO THE RATCHET     │
│ MECHANISM, A SIGNAL INDICATIVE OF THE SEQUENTIAL RATCHET    │
│ POSITION OF THE RATCHET MECHANISM                           │
│ 406                                                         │
└─────────────────────────────────────────────────────────────┘
```

FIG. 4

BRAKE LINING WEAR SENSOR

This application is a 35 USC 371 national phase filing of International Application No. PCT/BR2017/050013, filed Jan. 25, 2017, the disclosure of which is incorporated herein by reference in its entirety.

FIELD OF THE DISCLOSURE

Embodiments include a brake lining wear sensor and more particularly a brake lining wear sensor for a drum brake in a commercial vehicle.

BACKGROUND

Many types of vehicle braking systems use a high-friction surface to frictionally engage a moving part of the vehicle, e.g., a wheel, to slow or stop movement of the moving part with respect to a chassis of the vehicle. One type of braking system is a drum brake system, which may be mounted proximate a wheel hub. To engage the drum brake system, a brake shoe is actuated toward an inner surface of the brake drum. The brake shoe has a high-friction surface that presses against the inner surface of the brake drum. For example, if the brake drum is rotating, the rotation is slowed or stopped, and if the brake drum is stationary, rotation of the wheel is inhibited or prevented.

Drum brake systems typically employ a replaceable brake lining to provide the high-friction surface for the brake shoe. The replaceable brake lining, which is removably mounted on an outward facing surface of the brake shoe, may be made of rubber, ceramic, or other suitable materials, as is known in the art, and generally deteriorates over time due to the mechanical and thermal stresses caused by the braking process. The rate of deterioration of the brake lining is difficult to predict and may not directly correlate to common vehicle metrics, such as mileage or time. Thus, there is a need to accurately measure brake lining wear in a vehicle.

SUMMARY

Embodiments include a brake lining wear sensor and more particularly a brake lining wear sensor for a drum brake in a commercial vehicle. In one embodiment, a brake assembly having a non-braking configuration and a braking configuration includes a brake shoe movable between a neutral shoe position in the non-braking configuration and a braking shoe position in the braking configuration. The brake assembly also includes an actuator coupled to the brake shoe, the actuator movable along an actuation path between a neutral actuator position and a braking actuator position. The neutral actuator position is variable, with an actuator distance between the neutral actuator position and the braking actuator position increasing over time in response to a reduction in thickness of a brake lining installed on the brake shoe. The brake assembly further comprises a ratchet mechanism coupled to the actuator having a plurality of sequential ratchet positions. Moving the actuator from the neutral actuator position to the braking actuator position past a predetermined actuation distance causes the ratchet mechanism to advance to a next sequential ratchet position, which in turn moves the neutral actuator position of the actuator a predetermined distance away from the minimum actuator position. A sensor is coupled to the ratchet mechanism for detecting the sequential ratchet position of the ratchet mechanism.

This arrangement has several advantages. For example, brake liner wear causes the ratchet mechanism to gradually move the neutral actuator position farther away from the minimum actuator position, in order to compensate for the loss of thickness in the brake lining over time. By measuring the rotation angle of the ratchet mechanism, for example by detecting the sequential ratchet position of the ratchet mechanism, a current thickness of the brake lining can be monitored over the brake lining's entire service life, thereby allowing more accurate monitoring of the status of each brake lining and more efficient planning for brake repair and maintenance actions.

In one embodiment, a brake assembly having a non-braking configuration and a braking configuration is disclosed. The brake assembly comprises a brake shoe movable between a neutral shoe position in the non-braking configuration and a braking shoe position in the braking configuration. The brake assembly further comprises an actuator coupled to the brake shoe, the actuator movable along an actuation path between a neutral actuator position in the non-braking configuration and a braking actuator position in the braking configuration, wherein a distance between the neutral actuator position and the braking actuator position is substantially constant. The brake assembly further comprises a ratchet mechanism coupled to the actuator having a plurality of sequential ratchet positions. Moving the actuator from the neutral actuator position to the braking actuator position causes the ratchet mechanism to advance to a next sequential ratchet position to move the neutral actuator position of the actuator a predetermined distance away from a minimum actuator position. The brake assembly further comprises a sensor coupled to the ratchet mechanism for detecting the sequential ratchet position of the ratchet mechanism.

According to another embodiment, a method of measuring a brake lining wear condition is disclosed. The method comprises actuating an actuator coupled to a brake shoe of a braking assembly to move the actuator along an actuation path between a neutral actuator position and a braking actuator position. The method further comprises advancing a ratchet mechanism having a plurality of sequential ratchet positions to a next sequential ratchet position in response to the actuating the actuator. The method further comprises generating, by a sensor operably coupled to the ratchet mechanism, a signal indicative of the sequential ratchet position of the ratchet mechanism.

According to another embodiment, a non-transitory computer-readable medium comprising machine-readable instructions for directing a processing device to perform a method is disclosed. The method comprises receiving a signal from a sensor operably coupled to a ratchet mechanism of a brake assembly, the signal indicative of a sequential ratchet position of the ratchet mechanism. The method further comprises determining the sequential ratchet position of the ratchet mechanism based on the signal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 5:
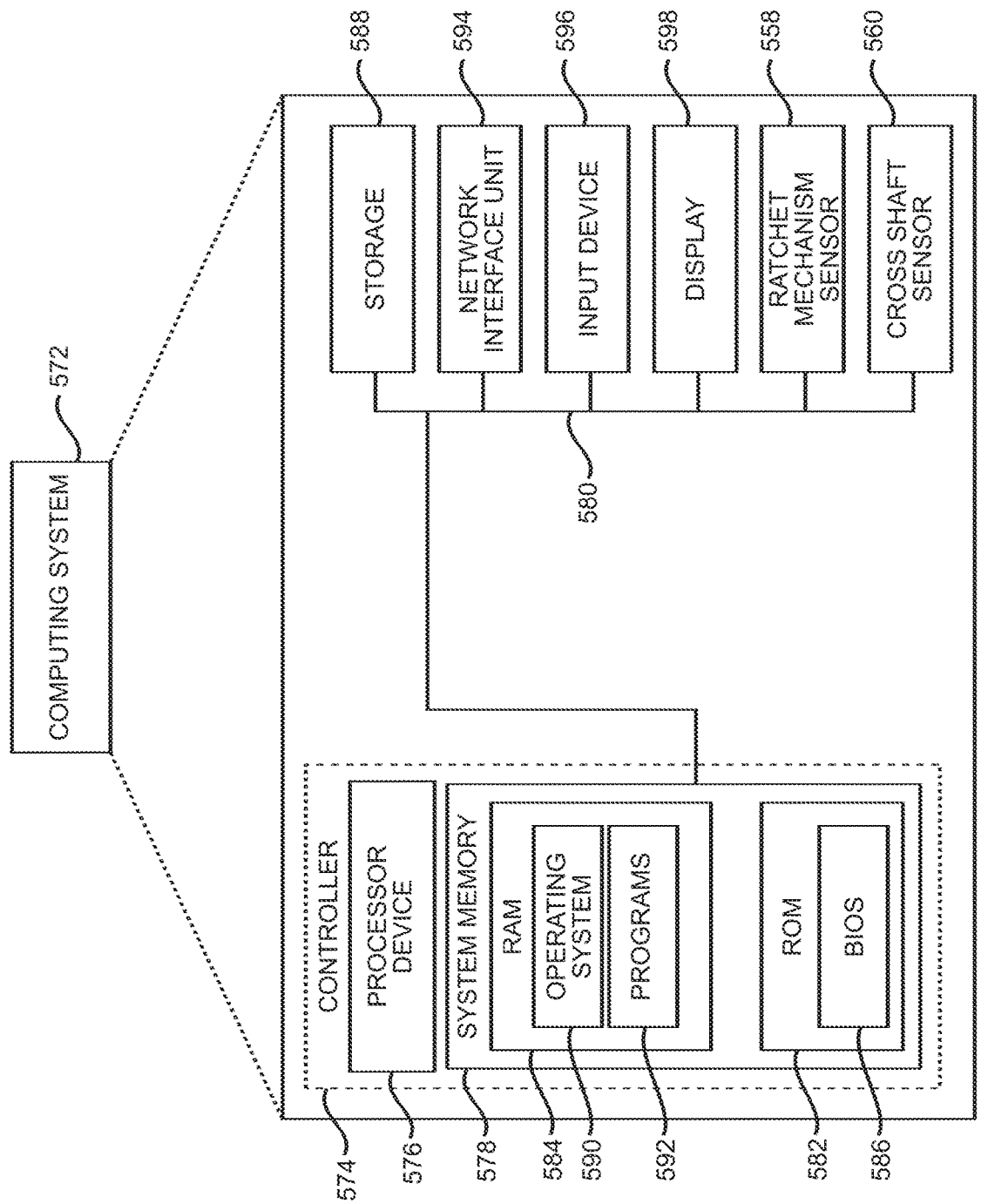

FIG. 4 is a flowchart diagram of a method of measuring a brake lining wear condition using a sensor operably connected to a ratchet mechanism to measure a sequential ratchet position of the ratchet mechanism; and FIG. 5 is a block diagram of a computing device having a processor device operably connected to the brake assemblies disclosed herein, to perform methods and other operations disclosed herein.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments include a brake lining wear sensor and more particularly a brake lining wear sensor for a drum brake in a commercial vehicle. In one embodiment, a brake assembly having a non-braking configuration and a braking configuration includes a brake shoe movable between a neutral shoe position in the non-braking configuration and a braking shoe position in the braking configuration. The brake assembly also includes an actuator coupled to the brake shoe, the actuator movable along an actuation path between a neutral actuator position and a braking actuator position. The neutral actuator position is variable, with an actuator distance between the neutral actuator position and the braking actuator position increasing over time in response to a reduction in thickness of a brake lining installed on the brake shoe. The brake assembly further comprises a ratchet mechanism coupled to the actuator having a plurality of sequential ratchet positions. Moving the actuator from the neutral actuator position to the braking actuator position past a predetermined actuation distance causes the ratchet mechanism to advance to a next sequential ratchet position, which in turn moves the neutral actuator position of the actuator a predetermined distance away from the minimum actuator position. A sensor is coupled to the ratchet mechanism for detecting the sequential ratchet position of the ratchet mechanism.

This arrangement has several advantages. For example, brake liner wear causes the ratchet mechanism to gradually move the neutral actuator position farther away from the minimum actuator position, in order to compensate for the loss of thickness in the brake lining over time. By measuring the rotation angle of the ratchet mechanism, for example by detecting the sequential ratchet position of the ratchet mechanism, a current thickness of the brake lining can be monitored over the brake lining's entire service life, thereby allowing more accurate monitoring of the status of each brake lining and more efficient planning for brake repair and maintenance actions.

Figure 1A:
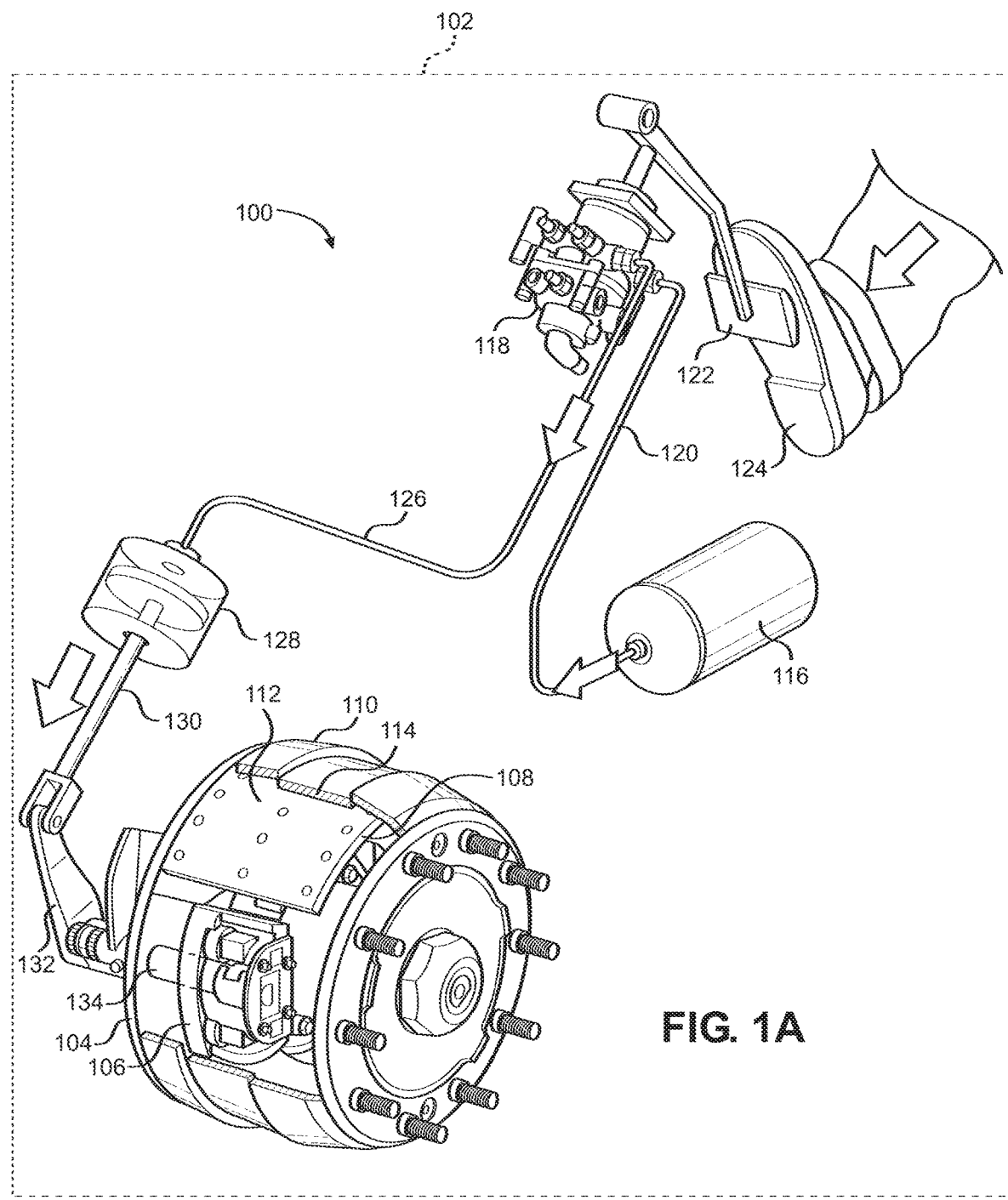
FIGS. 1A-1C illustrate a brake system for a vehicle having a drum brake assembly and brake lining wear sensor according to an embodiment.
Figure 1B:
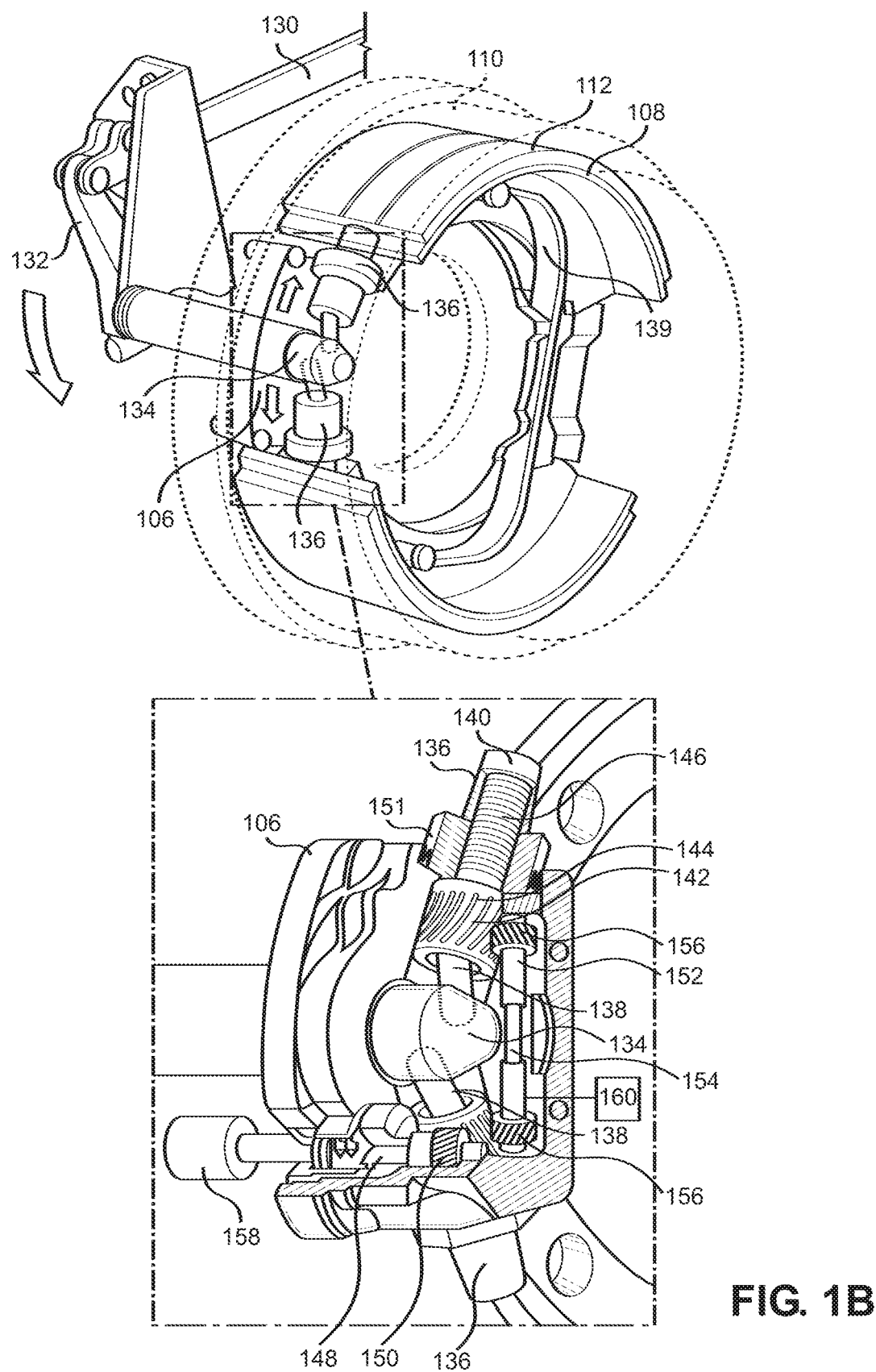
Figure 1C:
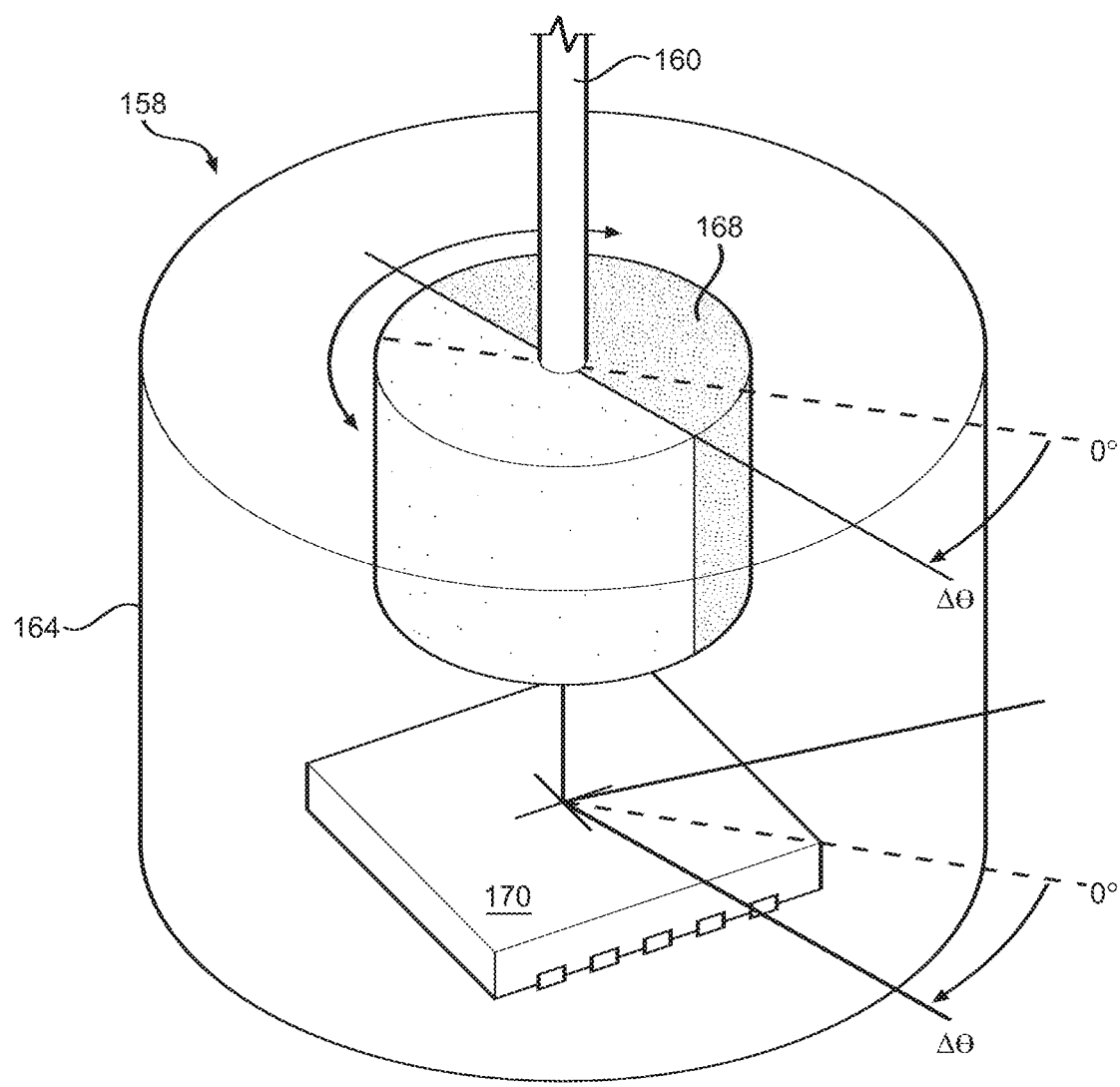

In this regard, FIGS. 1A-1C illustrate partial cutaway views of a brake system 100 and components thereof, according to an embodiment. The brake system 100 may be disposed in a vehicle 102, such as a commercial truck, for example. The brake system 100 includes one or more drum brake assemblies 104, each having a brake cam housing 106 and an opposed pair of brake shoes 108 disposed inside a brake drum 110, which may be coupled inside a wheel of the vehicle 102. Each brake shoe 108 includes a brake lining 112 configured to selectively engage an inner brake drum surface 114 of the brake drum 110 (or another brake surface, as desired).

In this embodiment, a pneumatic compressor 116 provides pneumatic pressure to a brake control valve 118 via a brake control input line 120. A brake control valve 118 is operatively connected to a brake pedal 122. A user's foot 124 presses down on the brake pedal 122 to release the brake control valve 118, thereby providing pneumatic pressure through a brake control output line 126 to a piston sub-assembly 128. The pneumatic pressure is applied to the piston sub-assembly 128 to move a push rod 130, which in turn rotates a brake lever 132 to rotate a brake cam 134 that extends into the brake cam housing 106.

Referring now to FIG. 1B, the rotation of the brake lever 132 rotates the brake cam 134 within the brake cam housing 106, which in turn moves a pair of actuator elements 136 away from the brake cam 134. Specifically, the rotation of the brake cam 134 causes a pair of thrust pins 138 to press an actuator engagement member 140 of each actuator element 136 against the respective brake shoe 108, thereby pressing the brake lining 112 into engagement with the inner brake drum surface 114 of the brake drum 110 of the vehicle 102.

As will be discussed in greater detail with respect to FIGS. 3A-3C, each actuator element 136 is adjustable, so that the rotation of the brake cam 134 causes the brake lining 112 to securely engage the inner brake drum surface 114 when the brake system 100 is engaged. In particular, each actuator element 136 includes a cam screw 142 (which may also be referred to herein as an actuator gear member) having gear grooves 144 arranged radially around the cam screw 142 at an angle. The cam screw 142 is rotatable with respect to a threaded actuator core member 146, which allows the cam screw 142 and actuator engagement member 140 to be adjusted with respect to the threaded actuator core member 146.

As the brake lining 112 wears down over time, it is necessary for the actuator element 136 to extend farther away from the brake cam 134 to press the brake lining 112 into secure engagement with the inner brake drum surface 114 when the brake system 100 is in the braking configuration. To address this issue, a ratchet mechanism 148, which may also be referred to herein as an adjustment mechanism, includes a ratchet mechanism gear member 150, which has a plurality of ratchet gear teeth that engage the gear grooves 144 of one of the cam screws 142. As the brake lining 112 wears down over time, the linear movement of the actuator element 136 between a neutral actuator position and a braking actuator position, which is required to engage the brake lining 112 with the inner brake drum surface 114, increases by the same amount. This in turn affects the force and travel required for the brake pedal 122 to engage the drum brake assembly, because more pressure is required to be delivered to the piston sub-assembly to rotate the brake cam 134 by the additional required amount.

The linear movement also causes the cam screw 142 to rotate the ratchet mechanism gear member 150 through an angle that is directly proportional to a distance of the linear movement. When the distance of the linear movement of the actuator element 136 passes a predetermined threshold, i.e., when the brake lining 112 is worn down past a predetermined threshold, the ratchet mechanism gear member 150 rotates through a predetermined threshold angle having a magnitude sufficient to advance the ratchet mechanism 148 to the next sequential ratchet position. This in turn prevents the ratchet mechanism gear member 150 from rotating back through the entire predetermined threshold angle.

As the brake cam 134 is disengaged, the linear movement of the cam screw 142 causes the ratchet mechanism gear member 150 to rotate back through a portion of the predetermined threshold angle, at which point the ratchet mechanism 148 inhibits further rotation of the ratchet mechanism gear member 150. As the brake cam 134 continues to disengage, the linear force on the angled gear grooves 144 of the cam screw 142 causes the cam screw 142 to rotate about the threaded actuator core member 146. The actuator engagement member 140, which is coupled to the brake cam housing 106 via a flexible gasket 151, is inhibited from rotating with the cam screw 142, and as a result, the cam screw 142 and threaded actuator core member 146 rotate with respect to the actuator engagement member 140, thereby moving the actuator engagement member 140 of the actuator element 136 a predetermined distance away from the brake cam 134. In this manner, as the brake lining 112 wears down over time, the actuator engagement member 140 is gradually moved towards the inner brake drum surface 114 over time, thereby maintaining the total distance between the neutral actuator position and the braking actuator position below a predetermined total distance, and in turn ensuring that the pneumatic pressure required to engage the brake is below a predetermined pressure threshold.

In this embodiment, a cross shaft 152 is also provided to synchronize the rotation of both of the cam screws 142. The cross shaft 152 includes a shaft member 154 having a cross shaft gear member 156 on either end of the shaft member 154, with each cross shaft gear member 156 having a plurality of shaft gear teeth engaging the gear grooves 144 of a respective cam screw 142. In this embodiment, the cross shaft 152 is freely rotatable and rotates in tandem with the ratchet mechanism gear member 150. In this manner, rotation of one cam screw 142 caused by the ratchet mechanism gear member 150 is translated to the other cam screw 142 such that the actuator elements 136 are adjusted in tandem.

As will be discussed in greater detail with respect to FIGS. 3A-3C below, it may be desirable to continuously measure the rotation of the ratchet mechanism gear member 150 over time, in order to measure a relative position of the actuator elements 136 with respect to the brake cam 134, which can in turn be used to determine a condition and remaining lifespan of the respective brake lining 112. In this regard, a ratchet mechanism sensor 158 may be operatively connected to the ratchet mechanism 148 for measuring rotation of the ratchet mechanism gear member 150. As shown in FIG. 1C, the ratchet mechanism sensor 158 in this embodiment measures the relative rotation of the ratchet mechanism gear member 150 by maintaining a running count of sequential ratchet positions of the ratchet mechanism 148, which correlates to the number of engagement/disengagement cycles performed by the brake cam 134. Since the number of brake cam 134 engagement/disengagement cycles corresponds to total rotation of each cam screw 142 and adjusted distance of the cam screw 142 and actuator engagement member 140 from the brake cam 134, this running count can be used to determine how much surface life is left for the brake linings 112. It should also be understood that other types of sensors may be used, such as angular rotation sensors and the like. In this embodiment, a cross shaft sensor 160 can also be used in addition to or in place of the ratchet mechanism sensor 158. The cross shaft sensor 160 can measure relative rotation of the cross shaft 152, similar to the measurement of the relative rotation of the ratchet mechanism gear member 150 by the ratchet mechanism sensor 158.

As shown by FIG. 1C, the ratchet mechanism sensor 158 in this embodiment includes a housing 164 and a sensor shaft 160 that is coupled to the ratchet mechanism 348 such that the sensor shaft 160 rotates in response to the rotation of the ratchet mechanism gear member 150. The rotation of the sensor shaft 160 causes a magnetic element 168 to rotate with respect to a transducer element 170, which in turn causes the transducer element 170 to generate a sensor signal indicative of the angular displacement $\Delta\theta$ of the sensor shaft 160. Because the sensor shaft 160 is connected to the ratchet mechanism 348 such that the sensor shaft 160 and ratchet mechanism gear member 150 rotate together, either in a 1:1 relationship or in direct proportion to one another, the sensor signal is indicative of the sequential ratchet position of the ratchet mechanism 148. In this embodiment, the ratchet mechanism sensor 158 is a Hall effect sensor, wherein the transducer element 170 produces a variable voltage in response to rotation of the magnetic element 168 to produce an analog response. It should be understood, however, that other types of sensors may be used instead of or in addition to the ratchet mechanism sensor 158 of this embodiment. It should also be understood that the same type of Hall effect sensor may be used as the cross shaft sensor 160 as well, in place of or in addition to the ratchet mechanism sensor 158.

Figure 2:
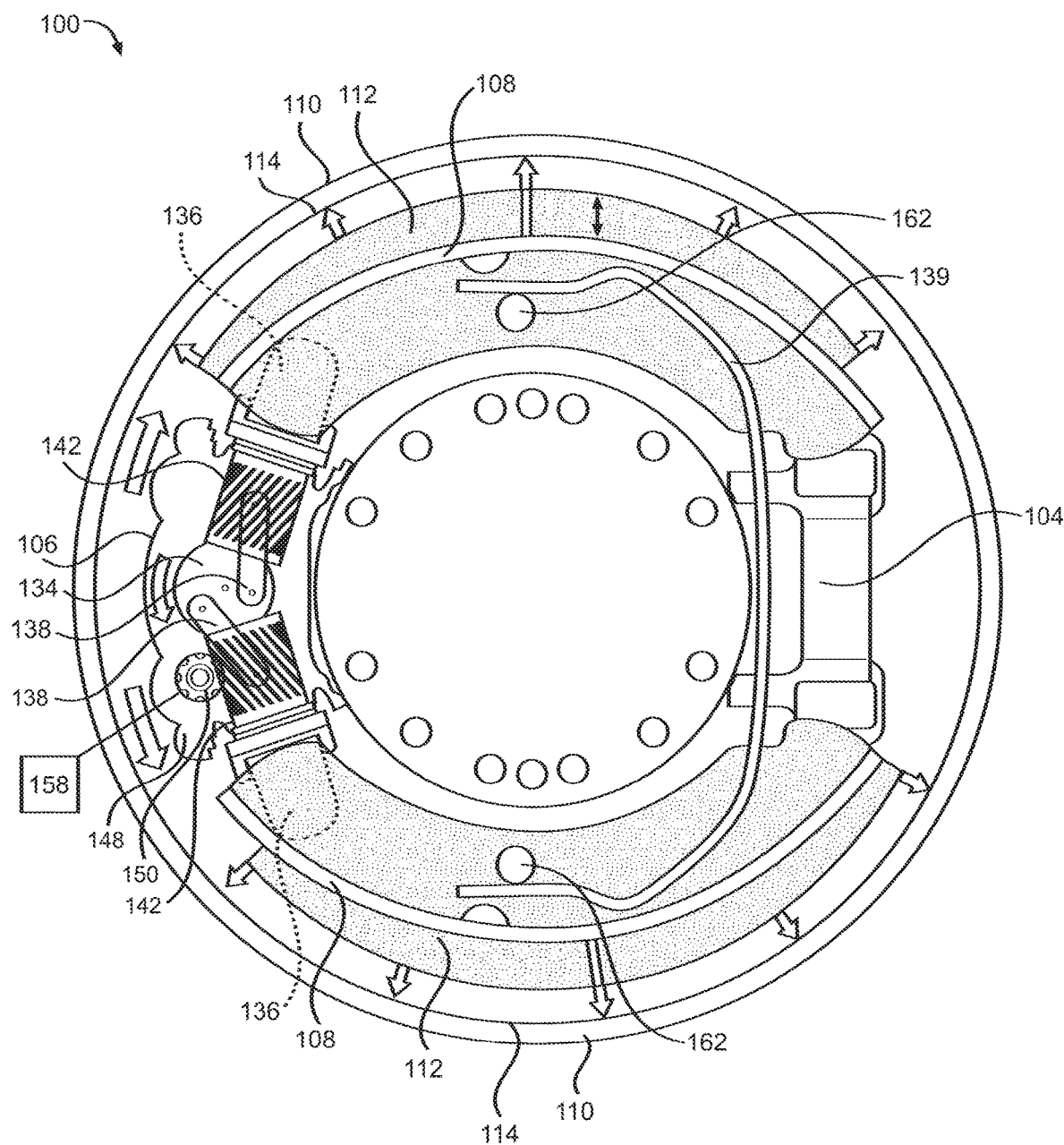
FIG. 2 is a side cutaway view of the drum brake assembly of FIGS. 1A and 1B.

Referring now to FIG. 2, a side cutaway view of a portion of the brake system 100 of FIGS. 1A and 1B is illustrated. As illustrated by FIG. 2, it can be seen how rotation of the brake cam 134 causes the thrust pins 138 to move the actuator elements 136 away from the brake cam 134, thereby pressing the brake shoes 108 toward the inner brake drum surface 114 of the brake drum 110. When the brake cam 134 is disengaged, a spring element 139 connected to the drum brake assembly 104 presses against a pair of spring engagement members 162 of the brake shoes 108 to urge the brake shoes 108 away from the inner brake drum surface 114 of the brake drum 110 to disengage the brake system 100.

Figure 3A:
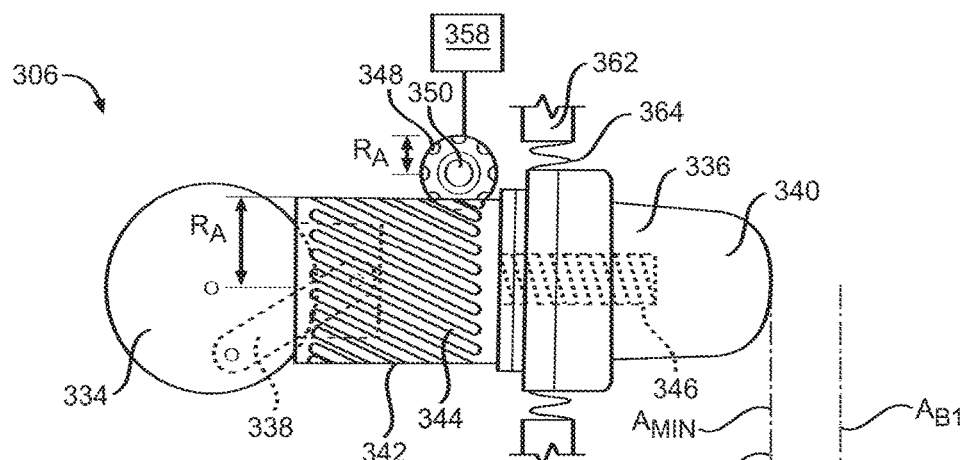
FIGS. 3A-3C illustrate operation of a ratchet mechanism of the drum brake assembly with a brake cam and actuator element similar to the drum brake assembly of FIGS. 1A-2, according to an alternative embodiment.
Figure 3B:
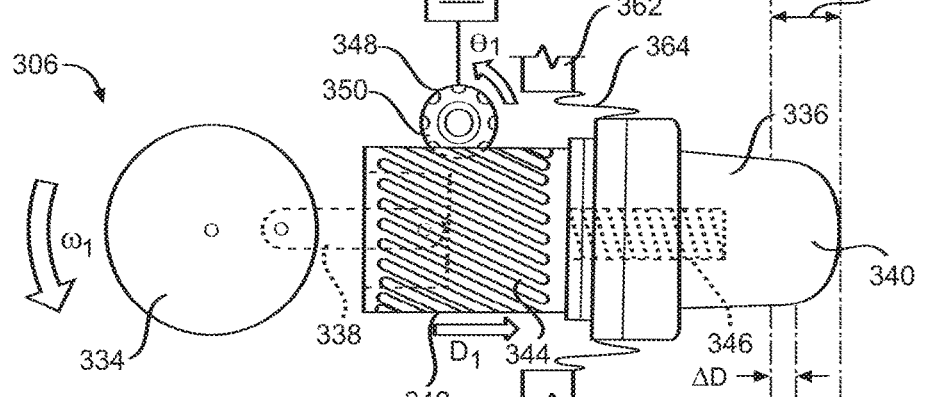
Figure 3C:
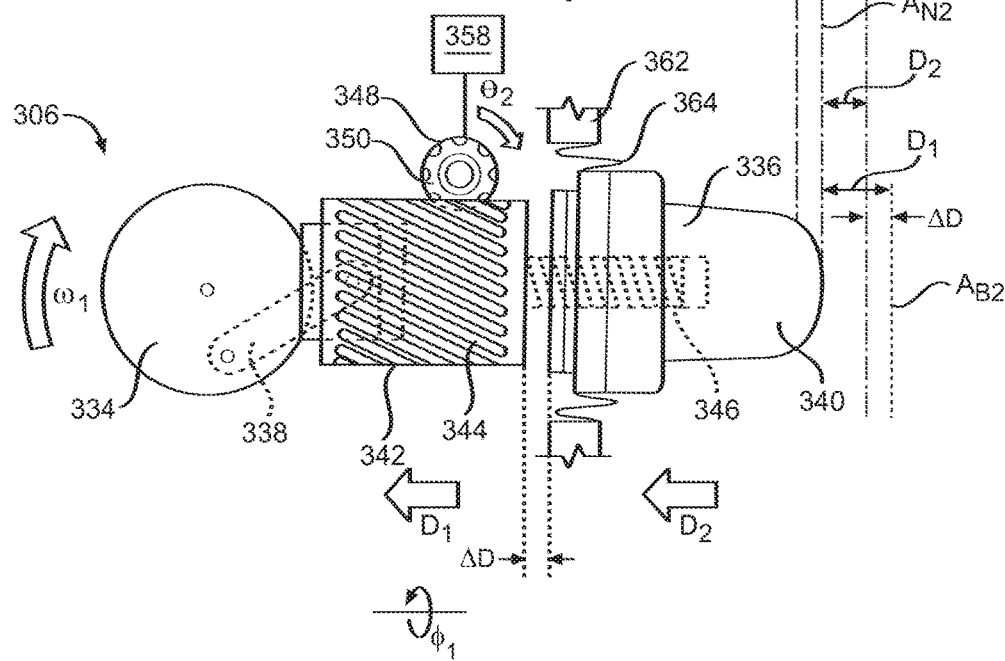

Referring now to FIGS. 3A-3C, a simplified view of a brake cam mechanism 306 similar to the mechanism contained in the brake cam housing 106 of FIGS. 1A-2 is illustrated. It should be understood that the distances illustrated by FIGS. 3A-3C are for ease of explanation and are not to scale. In FIG. 3A, a brake cam 334 is in a neutral position, with an end of an actuator element 336 disposed at a neutral actuator position $A_{N1}$. In this example, the neutral actuator position $A_{N1}$ is also a minimum actuator position $A_{MIN}$, which represents the minimum possible distance from the brake cam 334 for the end of the actuator element 336.

As with the brake cam housing 106 of FIGS. 1A-2, the actuator element 336 in this embodiment is connected to the brake cam 334 by a thrust pin 338. The actuator element 336 also includes an actuator engagement member 340 and a cam screw 342 having a plurality of angled grooves 344. The plurality of angled grooves 344 engage a ratchet mechanism gear member 350 of a ratchet mechanism 348, and the ratchet mechanism 348 is also operatively coupled to a ratchet mechanism sensor 358, which continuously measures the rotation of the ratchet mechanism gear member 350. As with the ratchet mechanism sensor 158 of FIGS. 1B and 10 above, the ratchet mechanism sensor 358 in the embodiment of FIGS. 3A-3C may be a Hall effect sensor or another type of sensor, as desired.

Referring now to FIG. 3B, the brake cam 334 is rotated through a predetermined angle $\omega_1$, which causes the thrust pin 338 to move the actuator element 336 from a neutral actuator position $A_{N1}$ over a distance D to a braking actuator position $A_{B1}$, sufficient to engage the brake lining (not shown) with the inner brake drum surface (not shown). As the brake lining (not shown) wears down, the distance D increases by the same amount, and an angle $\theta$ through which the ratchet mechanism gear member 350 increases in proportion to the increase in D. When the distance D reaches a predetermined threshold distance, $D_1$, the linear movement of the actuator element 336 causes the grooves 344 of the cam screw 342 to rotate the ratchet mechanism gear member 350 through a predetermined threshold angle $\theta_1$, which causes the ratchet mechanism 348 to advance one ratchet position.

Referring now to FIG. 3C, the brake cam 334 rotates back through the predetermined angle $\omega_1$ to disengage the actuator element 336. However, the ratchet mechanism gear member 350 is only able to rotate back through a smaller predetermined angle $\theta_2$, because the ratchet mechanism 348 prevents the ratchet mechanism gear member 350 from rotating through the entire predetermined angle $\theta_1$. As the actuator element 336 moves back towards the brake cam 334, the actuator engagement member 340 and the cam screw 342 together move back a reduced distance $D_2$ until the ratchet mechanism gear member 350 rotates back through the smaller predetermined angle $\theta_2$. At this point, the continued linear force on the angled grooves 344 of the cam screw 342 causes the cam screw 342 to rotate about the threaded actuator core member 346 through an angle $\phi_1$ in order to travel the remaining distance $\Delta D$, equal to $D_1$-$D_2$. Since rotation of the actuator engagement member 340 is inhibited by the flexible gasket 351 connecting the actuator engagement mechanism 340 to the brake cam housing 106, the cam screw 342 and threaded actuator core member 346 rotate with respect to the actuator engagement member 340 through the angle $\phi_1$, thereby moving the threaded actuator core member 346 and the cam screw 342 the remaining distance $\Delta D$ along the linear actuation path while maintaining the actuator engagement member 340 at the new neutral actuator position $A_{N2}$.

Thus is can be seen that the end of the actuator element 336 now has a new neutral actuator position $A_{N2}$, which is separated from the current actuator brake position $A_{B1}$ by a reduced distance $D_2$. As the brake lining (not shown) continues to wear down, the braking actuator position of engagement member 340 will reach $A_{B2}$, at which point the ratchet mechanism gear member rotates through the predetermined threshold angle $\theta_1$, which causes ratchet mechanism 348 to advance to the next sequential ratchet position. Since this gradual adjustment of the actuator element 336 is directly proportional to the difference between $\theta_1$ and $\theta_2$, measuring the angular displacement $\Delta\theta$ of the ratchet mechanism sensor 358 over time can also accurately and continuously measure the adjustment of the neutral actuator position $A_N$, the braking actuator position $A_B$, and the condition of the brake liner 112 over time.

The difference $\Delta\theta$ is equal to $\theta_2$-$\theta_1$ and corresponds to the angular displacement between sequential ratchet positions of the ratchet mechanism 348 and is also indicative of $\Delta D$, which is equal to $D_1$-$D_2$, and is also equal to the distance between neutral actuator positions $A_{N1}$ and $A_{N2}$ and the distance between braking actuator positions $A_{B1}$ and $A_{B2}$. By measuring AO over time using the ratchet mechanism sensor 358, the total $\Delta D$ of the actuator element 336 over time can be measured and/or derived from the sensor signal from the ratchet mechanism sensor 358. In some embodiments, the sensor signal may be indicative of a brake lining value corresponding to a brake lining condition parameter (such as a brake lining thickness, for example). As noted above, the ratchet mechanism sensor 358 in this embodiment is a Hall effect sensor that directly measures the angular displacement $\Delta\theta$ of the ratchet mechanism gear member 350 to generate an analog signal corresponding to a magnitude of $\Delta\theta$, which may also be used to determine the total $\Delta\theta$ and $\Delta D$ over time. In some embodiments, the ratchet mechanism sensor 358 may alternatively be a step sensor that generates a step signal indicative of the ratchet mechanism 348 advancing to a next sequential ratchet position, which is known to correspond to a predetermined $\Delta\theta$. Based on this sensor signal, the total $\Delta\theta$ and $\Delta D$ over time can be determined. It should be understood that other methods of determining the angular displacement of the ratchet mechanism gear member 350 may also be used, as desired.

Referring now to FIG. 4, a flowchart of a method 400 of measuring a brake lining wear condition is illustrated, according to an embodiment. The method comprises actuating an actuator coupled to a brake shoe of a braking assembly to move the actuator a predetermined actuation distance along an actuation path between a neutral actuator position and a braking actuator position (Block 402). The method 400 further comprises advancing a ratchet mechanism having a plurality of sequential ratchet positions to a next sequential ratchet position in response to the actuator moving the predetermined actuation distance along the actuation path (Block 404). The method 400 further comprises generating, by a sensor operably coupled to the ratchet mechanism, a signal indicative of the sequential ratchet position of the ratchet mechanism (Block 406).

The components and features herein may be embodied in one or more computing devices, such as a computing system 572 illustrated in FIG. 5, or computer-readable media having computer-readable instructions, operable for performing methods, such as elements of the method 400 of FIG. 4, disclosed herein. In this embodiment, the computing system 572 may be operably connected to, or part of, a brake assembly, such as the brake system 100 of FIGS. 1A-2, or another part of a vehicle, such as the vehicle 102 of FIGS. 1A-2. In another embodiment, the computing system 572 may be remotely located from the brake system and/or vehicle.

In this embodiment, the computing system 572 may comprise any computing or processing device capable of including firmware, hardware, and/or executing software instructions to implement the functionality described herein and which is capable of being incorporated into components disclosed herein. In this example, the computing system 572 of FIG. 5 includes a controller 574 having a processor device 576, a system memory 578, and a system bus 580. The system bus 580 provides an interface for system components including, but not limited to, the system memory 578 and the processor device 576. The processor device 576 can be any commercially available or proprietary processor.

The system bus 580 may be any of several types of bus structures that may further interconnect to a memory bus (with or without a memory controller), a peripheral bus, and/or a local bus using any of a variety of commercially available bus architectures. The system memory 578 may include non-volatile memory 582, e.g., read-only memory (ROM), erasable programmable read-only memory (EPROM), electrically erasable programmable read-only memory (EEPROM), etc., and/or volatile memory 584, e.g., random-access memory (RAM). A basic input/output system (BIOS) 586 may be stored in the non-volatile memory 582 and can include the basic routines that help to transfer the information between the elements within the computing system 572.

The computing system 572 may further include a non-transitory computer-readable storage 588, which may comprise, for example, internal solid-state memory, or the like. The computer-readable storage 588 may provide non-volatile storage of the data, the data structures, the computer-executable instructions, and the like. The data structures can store information relating to, for example, vehicle information, such as diagnostic information, or user information. Computer-executable instructions may include pre-defined data processing instructions or downloaded instructions for data processing at a specified time or interval, for example.

A number of modules can be stored in the computer-readable storage 588 and/or in the volatile memory 584, including an operating system 590 and one or more programs 592, which may implement the functionality described herein in whole or in part.

In addition, the computing system 572 may include additional components, such as a network interface unit 594 or other communications interface, one or more input devices 596, and a display 598 or other visual indicator interface. In this embodiment, the display 598 may be part of an alert connected to receive an input from the sensor(s) 558, 560 or another part of the computing system 572 indicating a brake lining status of a brake assembly, such as the brake system 100 of FIGS. 1A-2, for example, and automatically provide an alert in response to receiving the input. In this embodiment, the display 598 provides a visual alert, but it should be understood that different numbers and types of alerts may be provided as well. The alert may also be provided as part of a different device or as a standalone alarm operably connected directly or indirectly to the sensor(s) 558, 560, as desired. The components of the computing system 572 may interact with other components outside of the computing system 572, such as other components of the vehicle or another computing device.

Those skilled in the art will recognize improvements and modifications to the preferred embodiments of the present disclosure. All such improvements and modifications are considered within the scope of the concepts disclosed herein and the claims that follow.

What is claimed is:

1. A brake assembly having a non-braking configuration and a braking configuration, the brake assembly comprising:
   a brake shoe movable between a neutral shoe position in the non-braking configuration and a braking shoe position in the braking configuration;
   a brake lining coupled to the brake shoe for engaging with a portion of a brake surface in response to the brake shoe moving to the braking shoe position in the braking configuration;
   an actuator coupled to the brake shoe, the actuator movable along an actuation path between a neutral actuator position in the non-braking configuration and a braking actuator position in the braking configuration, wherein an actuator distance between the neutral actuator position and the braking actuator position increases in response to a reduction in thickness of the brake lining;
   a ratchet mechanism coupled to the actuator having a plurality of sequential ratchet positions, wherein the actuator distance exceeding a first predetermined distance causes the ratchet mechanism to rotate through a predetermined threshold angle to automatically advance to a next sequential ratchet position to move the neutral actuator position of the actuator a second predetermined distance away from a minimum actuator position, the ratchet mechanism prevents rotation back through at least a portion of the predetermined threshold angle; and
a sensor coupled to one of the ratchet mechanism or the actuator for determining the sequential ratchet position of the ratchet mechanism.

2. The brake assembly of claim 1, wherein the brake shoe is a drum brake shoe.

3. The brake assembly of claim 1, wherein the brake lining has an initial thickness, and
wherein the actuator is manually adjustable to set the neutral actuator position to a predetermined neutral actuator position based on the initial thickness of the brake lining.

4. The brake assembly of claim 1, wherein the actuator comprises a plurality of actuator grooves; and
the ratchet mechanism comprises a plurality of ratchet gear teeth engaging the plurality of actuator grooves,
wherein the actuator distance exceeding the first predetermined distance causes the ratchet mechanism to rotate to the next sequential ratchet position.

5. The brake assembly of claim 4, wherein the actuator comprises:
a plurality of actuators each having a respective neutral actuator position and braking actuator position; and
a cross shaft comprising:
a first plurality of shaft gear teeth engaging the actuator grooves of a first actuator of the plurality of actuators: and
a second plurality of shaft gear teeth engaging the actuator grooves of a second actuator of the plurality of actuators;
wherein moving the first actuator from the respective neutral actuator position to the respective braking actuator position causes the cross shaft to rotate to cause the second actuator to move from the respective neutral actuator position to the respective braking actuator position.

6. The brake assembly of claim 5, wherein the sensor is coupled to the cross shaft for measuring an angular displacement of the cross shaft to determine the sequential ratchet position of the ratchet mechanism.

7. The brake assembly of claim 1, wherein the sensor is coupled to the ratchet mechanism for measuring an angular displacement of the ratchet mechanism to determine the sequential ratchet position of the ratchet mechanism.

8. The brake assembly of claim 1, wherein the sensor is a Hall effect sensor.

9. The brake assembly of claim 1, further comprising a processor device operably coupled to the sensor for determining a brake lining condition value based on a sensor signal received from the sensor, the sensor signal indicative of the sequential ratchet position of the ratchet mechanism.

10. The brake assembly of claim 9, further comprising a display component operably coupled to the processor device for displaying a brake lining status in response to the brake lining condition value.

11. A method of measuring a brake lining wear condition, the method comprising:
actuating an actuator coupled to a brake shoe of a braking assembly to move the actuator a predetermined actuator distance along an actuation path between a neutral actuator position and a braking actuator position;
automatically advancing a ratchet mechanism having a plurality of sequential ratchet positions to a next sequential ratchet position in response to the actuator moving the predetermined distance along the actuation path and the ratchet mechanism rotating through a predetermined threshold angle, the ratchet mechanism preventing rotation back through at least a portion of the predetermined threshold angle;
generating, by a sensor operably coupled to the ratchet mechanism, a signal indicative of the sequential ratchet position of the ratchet mechanism.

12. The method of claim 11, further comprising:
receiving, by a processor device in communication with the sensor, the signal from the sensor; and
determining, by the processing device, the sequential ratchet position of the ratchet mechanism.

13. The method of claim 12, further comprising:
determining, by the processing device, a brake lining value corresponding to a brake lining condition parameter coupled to the brake shoe based on the determined sequential ratchet position of the ratchet mechanism.

14. The method of claim 13, further comprising, prior to actuating the actuator:
adjusting the actuator to set the neutral actuator position to a predetermined neutral actuator position based on an initial thickness of the brake lining installed on the brake shoe; and
resetting, by the processing device, the brake lining condition value.

15. The method of claim 12, further comprising displaying, by a display component operably coupled to the processor device, a brake lining status in response to the brake lining condition value.

16. The method of claim 11, wherein generating the signal comprises detecting the advancing of the ratchet mechanism to the next sequential ratchet position, and
wherein the signal is indicative of the advancing of the ratchet mechanism to the next sequential ratchet position.

17. The method of claim 11, wherein actuating the actuator causes the actuator to rotate an adjustment gear member of the ratchet mechanism,
wherein generating the signal comprises detecting an angular displacement of the adjustment gear member in response to actuating the actuator, and
wherein the signal is indicative of the detected angular displacement of the adjustment gear member.

18. The method of claim 11, further comprising:
prior to actuating the actuator, adjusting the actuator to set the neutral actuator position to a predetermined neutral actuator position based on a thickness of the brake lining installed on the brake shoe.

19. The method of claim 11, wherein the actuator comprises a plurality of actuators,
wherein actuating the actuator causes the plurality of actuators to rotate a cross shaft connected between the actuators,
wherein generating the signal comprises detecting an angular displacement of the cross shaft in response to actuating the actuator, and
wherein the signal is indicative of the detected angular displacement of the adjustment gear member.

20. A non-transitory computer-readable medium comprising machine-readable instructions for directing a processing device to perform a method comprising:
receiving a signal from a sensor operably coupled to a ratchet mechanism of a brake assembly, the signal indicative of a sequential ratchet position of the ratchet mechanism, the ratchet mechanism configured to automatically advance to a next sequential ratchet position in response to rotating through a predetermined threshold angle, the ratchet mechanism prevents rotation back through at least a portion of the predetermined threshold angle; and determining the sequential ratchet position of the ratchet mechanism based on the signal.

\* \* \* \* \*